United States Patent [19]

Juds et al.

[11] Patent Number: 5,046,841
[45] Date of Patent: Sep. 10, 1991

[54] TOKEN HAVING A PREDETERMINED OPTICAL CHARACTERISTIC, AND A TOKEN VALIDATION DEVICE FOR USE THEREWITH

[75] Inventors: Scott Juds, Everett, Wash.; Johnny H. Halsey; James H. Halsey, both of El Dorado, Ark.

[73] Assignee: IDX, Inc., El Dorado, Ark.

[21] Appl. No.: 299,183

[22] Filed: Jan. 19, 1989

[51] Int. Cl.⁵ .............................................. G06K 9/74
[52] U.S. Cl. ..................................................... 356/71
[58] Field of Search ...................... 356/71; 235/454; 250/556, 222.1

[56] References Cited

U.S. PATENT DOCUMENTS 3,324,283  6/1967  Chu ..................................... 235/454
4,011,435  3/1977  Phelps et al. ........................ 235/454
4,034,211  7/1977  Horst et al. ............................ 356/71
4,211,918  7/1980  Nyfeler et al. ....................... 235/454
4,837,425  6/1989  Edwards ............................... 235/454

FOREIGN PATENT DOCUMENTS 75674    4/1983  European Pat. Off. ............ 235/454
2659639  6/1978  Fed. Rep. of Germany ...... 235/454

Primary Examiner—Richard A. Rosenberger
Attorney, Agent, or Firm—Diller, Ramik & Wight

[57] ABSTRACT

A token having predetermined optical characteristics can be tested by a token validation device that subjects the token to optical testing to determine the presence or absence of the predetermined optical characteristics. A single token can include a plurality of different predetermined optical characteristics to increase its coding content.

25 Claims, 3 Drawing Sheets

TOKEN HAVING A PREDETERMINED OPTICAL CHARACTERISTIC, AND A TOKEN VALIDATION DEVICE FOR USE THEREWITH

TECHNICAL FIELD

This invention relates generally to tokens that are used to enable token operated devices, and to token validation devices used in such token operated devices. More specifically, this invention relates to optically encoded tokens and related accept/reject devices that are capable of validating correctly encoded tokens and rejecting incorrectly encoded tokens.

BACKGROUND ART

Coin operated devices are well known in the art. In addition to the ubiquitous vending machines that are used to dispense various items of merchandise, there are, for example, coin operated car washes, laundramats, games, parking meters, and slot machines. Such mechanisms provide a number of important advantages, both to the provider of the goods and services and to the individuals who use them. For example, the mechanisms can be placed in an unsupervised setting, such that the owner/operator can provide needed goods or services without incurring attendant labor costs and inconveniences, and the user can obtain needed goods or services at a reasonable price in a convenient manner.

As an alternative to the use of coins minted by governmental bodies as legal tender, tokens are often used as a substitute media of value exchange for goods and services marketed by a particular organization. Tokens provide important advantages in this context. For example, an unsupervised coin box full of tokens may present little attraction to a thief, if the tokens have limited (or no) exchange value outside of a particular vending environment. Also, tokens are often viewed by their users as "non-money", and are frequently spent more freely by the user because of this. Further, tokens are often kept as souvenirs by users without redemption to the obvious benefit of the owner/operator. Tokens also allow an owner/operator to alter the selling price of the token without requiring commensurate changes to the token operated machinery or system.

Despite these numerous advantages, however, token usage has met with limited acceptance, primarily for one reason; tokens sponsored by various organizations (and perhaps offered at differing prices) cannot always be reliably distinguished from one another by existing coin operated devices. This problem becomes particularly troublesome when two (or more) organizations offer similar tokens at different prices in geographic nexus to one another. The organization offering the higher priced tokens will often find the lesser priced tokens in their coin boxes, creating an obvious loss of revenue.

The above noted problem exists primarily because only a few diameters for tokens are, as a practical matter, available for use. For example, the U.S. Treasury Department prohibits tokens that are too close in physical size to official coinage. Further, tokens larger than a quarter or smaller than a dime find little long term acceptance with either owner/operators or users. Also, manufacturing and testing tolerances require a 0.020 to 0.030 inch diameter window. As a net result, there are only about six available useful token diameters. Coding tokens solely on the basis of diameter therefore has not provided significant competition as an alternative to legal tender coinage, particularly in metropolitan areas.

Alternative methods of encoding tokens have been suggested. One system, marketed under the name Q-bit, uses a plurality of parallel grooves on the face of the token to create a code. Different codes can be created by including (or not including) such grooves in predetermined positions on the token. Because of physical tolerances and redundancies required by this approach, there are only about 32 unique codes that can be provided. Also, this approach requires expensive and often times difficult retrofitting of existing equipment, and further requires that each possible acceptable token have associated therewith a particular validation screen that must mate physically with the token being tested, such that certain machines must have certain specific screens to accomodate certain specific tokens.

Another suggested encoding method for use with tokens, used primarily by the gaming industry, provides for the placement of a bar code on the edge of the token. This bar code, similar to the UPC bar code found on most consumer products, serves to uniquely identify the token sponsor and the denomination of the token itself. Although such a coding approach allows a significantly increased number of unique codes, this approach also requires the use of laser bar code scanners, the latter being significantly more expensive than typical coin acceptor mechanisms. Although the complexity, and hence cost, of such a scanner can be reduced by using tokens having the bar code printed on a face thereof (as versus the side), such tokens are also considerably more easy to counterfeit by simple ink stamping techniques.

A need therefore exists for a token that offers an increased number of available codes, and that can be manufactured in a relatively low cost manner. Preferably, such a token should be usable with a reasonably priced and readily retrofitable token validating device.

SUMMARY OF THE INVENTION

These needs and others are substantially met through provision of the token and token validation device disclosed herein.

The token has at least one predetermined optical characteristic (as used herein, the term "optical characteristic" refers to the tendency of a particular object, or portion of an object, to reflect, refract, or defract light with respect to a known angle or angles; the term does not refer to the tendency of a particular surface to absorb or reflect light as exploited by character recognition devices and the like). The token validation device includes an optical sensor that tests the token with respect to this predetermined optical characteristic, and a validation mechanism that can determine the validity of the token based upon the results of this test.

In one embodiment, the outcome of this test can be used to control activation of a mechanism that accepts or rejects the offered token.

The predetermined optical characteristics can be produced, in one embodiment, by forming light bending impressions in the token surface or subsurface. These light bending impressions can be, for example, prismatic facets, reflective facets, or diffraction gratings. (Light bending through use of diffraction gratings can be differentiated from reflective or refractive light bending by use of a wavelength sensitivity test.) Unique codes for the tokens can be generated by specifying, from a predetermined set of light bending angles, a specific light bending angle for each location in a predetermined set of locations on the token.

In one embodiment, the token can be a disc shaped object. The predetermined optical characteristics can be symetrically disposed about the disc, such that the characteristic is substantially orientation independent with respect to the axis of the disc. A radial pattern of repetitive groups of such characteristics, for example, would represent one useful embodiment. Such orientations simplify the task of the token validation device when testing the token for the presence of the predetermined optical characteristic or characteristics.

In another embodiment, an annular pattern of concentric rings formed of such characteristics could be located on the token. In particular, the predetermined optical characteristics could be located in an outer peripheral area about the disc. If desired, additional predetermined optical characteristics could be included, which additional characteristics could be located in inner peripheral areas of the disc. As before, the particular type of optical characteristics, and their respective locations vis a vis one another, would form a code that could be used to uniquely identify and validate the token.

In yet another embodiment, an interior area of the token can be used to provide a human readable identifying indicia, such as the proprietor's trademark or the like.

The tokens may be formed by any appropriate high volume, low cost manufacturing technique, such as plastic injection molding, plastic hot stamping, minting, metal stamping, or photographically reproduced gratings, dependent in part on the method of light bending used.

In the token validation device, the optical sensor can include a light source for directing a source light beam at each location in the predetermined set of light bending locations at which an optical characteristic is to be tested on the token. The token validation device can also include a light sensor for sensing a resultant light beam produced when the source light beam interacts with the predetermined optical characteristic or characteristics of the token. The presence of an expected resultant light beam in an appropriate location and intensity can be used to confirm the validity of the token.

To facilitate the above, in one embodiment the token validation device includes a light energy responsive unit that can determine whether the resultant light beam has at least a predetermined intensity.

In another embodiment, the optical characteristic of each location in the predetermined set of light bending locations can be tested in a serial manner. In a different embodiment, all optical characteristics can be tested in parallel.

BRIEF DESCRIPTION OF THE DRAWINGS

These and other attributes of the invention will become more clear upon making a thorough review and study of the following description of the best mode for carrying out the invention, particularly when reviewed in conjunction with the drawings, wherein.

BEST MODE FOR CARRYING OUT THE INVENTION

Figure 1:
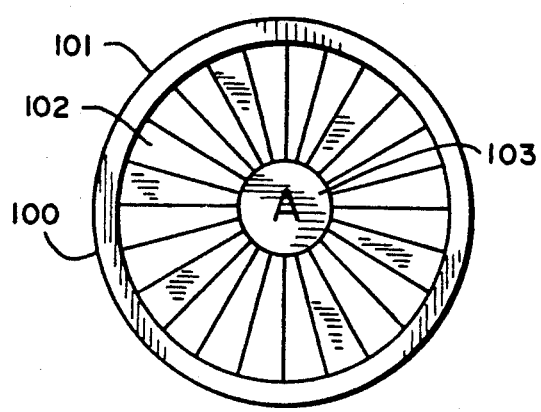
FIG. 1 comprises a top plan view of a first embodiment of a token.

Referring now to the drawings, and in particular to FIG. 1, the token of the invention will be described first. In this embodiment, the token (100) may be comprised of a substantially disc shaped object molded of plastic or some other appropriate material. In keeping with its intended purposes, the token (100) may be sized similarly to a coin or a handheld game piece.

Figure 2:
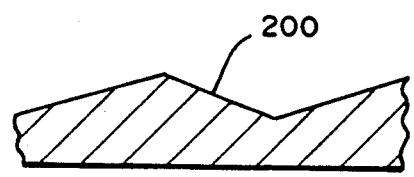
FIG. 2 comprises a side elevational sectioned detail view of the token.

A raised lip (101) can be disposed about the periphery of the token (100) to protect the token (100) and provide it with additional structural support. The peripheral area (102) of the token (100) in general also has a plurality of radially disposed facets (reflective, refractive, or diffractive as appropriate to the application) formed thereon, the purpose and function of which will be made more clear below. (A representation of a particular facet may be seen more clearly with reference to FIG. 2, wherein one example of a facet is shown in cross section as indicated by the reference numeral 200.)

These facets each provide a predetermined optical characteristic. More particularly, when a source light beam is directed onto each facet at a predetermined angle, the resulting light beam will be refracted (or reflected or diffracted, as the case may be) in a predetermined manner.

Figure 3:
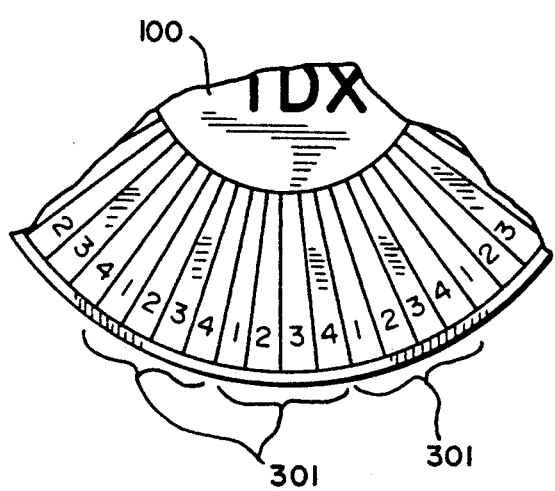
FIG. 3 comprises a top plan enlarged detail view of a token.

With reference to FIG. 3, related groups of such facets can be radially disposed about the token (100). In the embodiment depicted, each group (301) of facets includes four facets (numbered 1, 2, 3, and 4), with each facet having a predetermined optical characteristic. For example, all four facets could be reflective facets having predetermined light bending angles. The group of four is then radially repeated around the token (100) (in the embodiment depicted, for example, there could be twenty-four groups of four facets each). By this configuration, the predetermined optical characteristics are made substantially orientation independent with respect to the token's axis.

Referring again to FIG. 1, the central area (103) of the token (100) can be used for various purposes, including extensions of the previously described facets, other and different facets, or for supporting an identifying indicia, such as a trademark (A) that can be readily discerned by a human observer.

So configured, such a token can be tested by an appropriate token validation device (as described in more detail below) to determine whether the token has the expected optical characteristics. The token itself has little intrinsic value, since it cannot be used as a medium of exchange except for the purposes of the proprietor who distributes it. Incentives to counterfeit are also minimized, since various proprietors would use differently coded tokens (i.e., because a large number of possible unique codes are available with this approach, the tokens would each likely have different optical characteristics from one another to allow one group of tokens for one proprietor to be distinguished from another group of tokens being used by another proprietor) and the costs of copying a token to produce a counterfeit would not likely be economically feasible.

Figure 5:
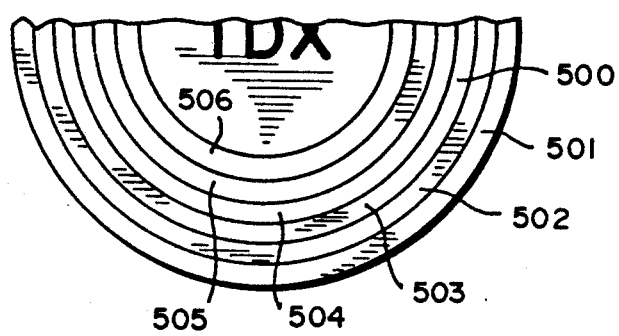
FIG. 5 comprises a top plan enlarged detail view of another embodiment of a token.

Referring now to FIG. 5, a second embodiment of a token will be described. This token (500) has an outer peripheral area (501) that includes a facet having a first predetermined optical characteristic, and succeeding inner peripheral areas (502-506) that include facets having their own predetermined optical characteristics. So configured, the coding would be dependent upon the selected optical characteristics themselves, and their order of presentation. The annular orientation again provides for a token that is substantially orientation independent with respect to the detection process. In other respects, this token (500) would be similar to the token (100) described above.

Such tokens having separately coded areas could be appropriately tested to ascertain the presence and location of the specified facets as a part of the validation process. If desired, of course, a token could be provided with fewer or more of such coded areas. In general, the greater the number of different facets, the more complicated the code, and the greater the number of unique codes.

In another embodiment, a token could have radially disposed facets on one side (as depicted in FIG. 3) and anularly disposed facets on the opposite side (as depicted in FIG. 5). This would provide two dimensions of displacement as versus only one. This approach provides a high number of coding permutations. For example, if all of the anular facets are provided with one of five possible deflecting angles (optical characteristics), and the radial facets are provided in groups of four, each having one of six possible deflecting angles (optical characteristics), then 160 practical uniquely encoded tokens are possible (presuming a parallel read decoding device; a serial read decoding device would allow for 4,096 unique codes).

Figure 4:
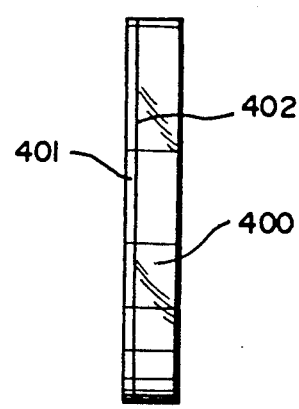
FIG. 4 comprises a side elevational view of a token.

With reference to FIG. 4, a token (400) can be left axially transparent, or in an appropriate application and as an alternative embodiment, a backing material (401) can be provided on one side of a token (400). Depending upon the application, it may also be appropriate that the inner surface (402) of the backing material (401) have a reflective surface. Such a backing material (401) could also be used for displaying various desired designs and indicia, such as the proprietor's trademarks or the like.

Figure 6:
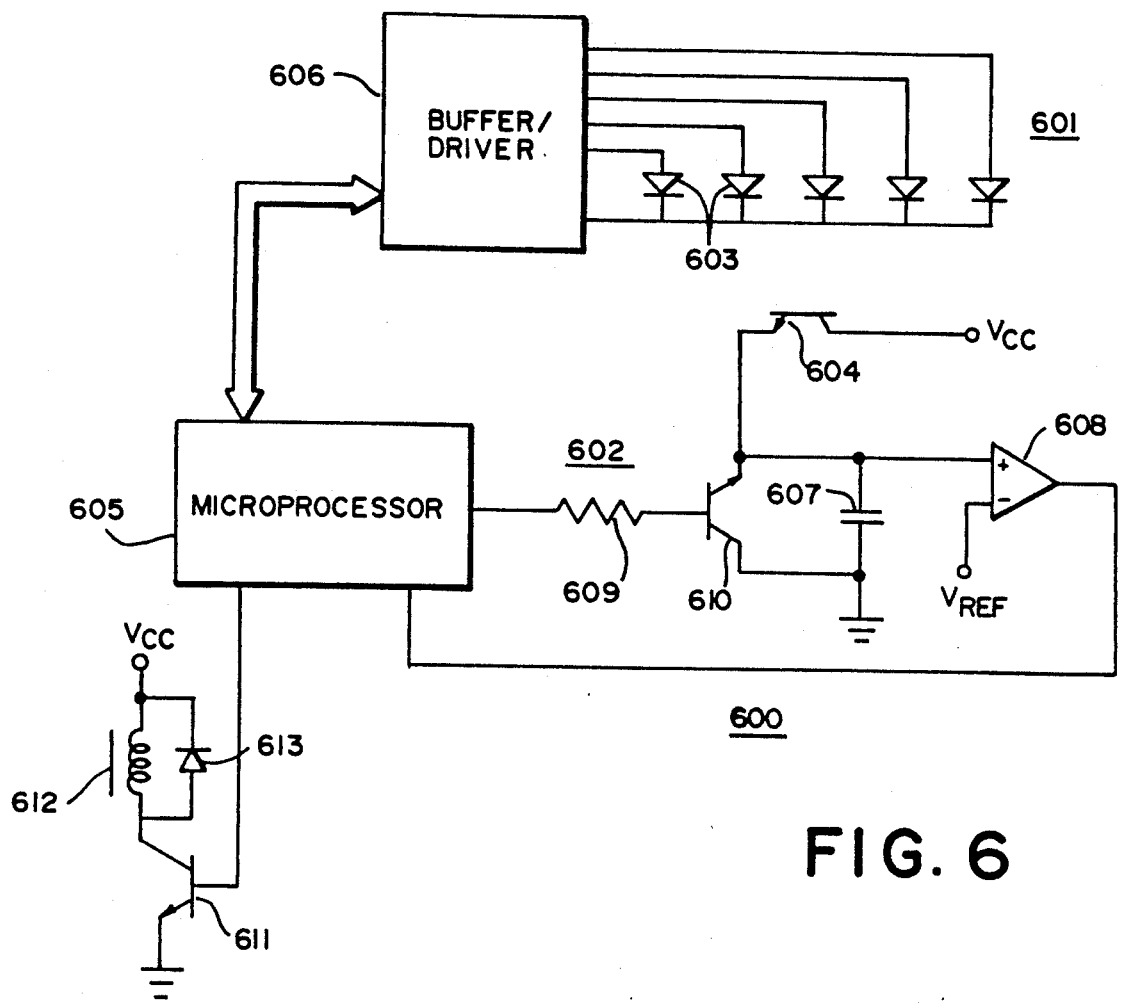
FIG. 6 comprises a schematic diagram of a token validation device.

Referring now to FIG. 6, a token validation device (600) will be described. The token validation device (600) includes generally an optical sensing unit (601) and a validation unit (602).

The optical sensing unit (601) includes, in this embodiment, a plurality of LEDs (603) and a photosensitive transistor (604). The LEDs (603) are controlled in seriatim fashion by a microprocessor (605) (such as a 68HC05C4P as manufactured by Motorola, Inc.) through an appropriate buffer/driver unit (606).

The validation unit (602) includes a capacitor (607) that connects to the output of the phototransistor (604) and to one input of a comparator (608). The remaining input to the comparator (608) connects to receive a reference signal ($V_{REF}$). The output of the comparator (608) provides an output signal to the microprocessor (605). The microprocessor (605) also connects through an appropriate resistor (609) to a transistor (510) that is connected to the capacitor (607) in an arrangement that allows the capacitor (607) to be quickly discharged when the transistor (510) is switched active by the microprocessor (605).

Finally, the microprocessor (605) provides an output signal when appropriate to a transistor (611) that in turn enables an accept-gate coil (612) that is configured in conjunction with a flyback diode (613). When enabled, the accept-gate coil (612) causes the token being tested to be directed to a token collection box in accordance with well understood prior art technique.

In practice, a token as described above can be disposed in a known orientation (with respect to its principal plane) between the LEDs (603) and the photosensitive transistor (604) (as described below in more detail). When the token has been properly positioned, the microprocessor (605) can activate each LED (603), one at a time. Each LED (603) will provide a source light beam that can contact a facet on the token. The facet will cause the source light beam to be affected in some known way (through refraction, diffraction or reflection, for example), and thereby produce a resultant light beam.

Depending upon the exit angle of the resultant light beam, the photosensitive transistor (604) may be able to sense it. Further, the current output of the photosensitive transistor (604) will be a direct function of the intensity with which the resultant light beam strikes the photosensitive transistor (604).

This output of the photosensitive transistor (604) will charge the capacitor (607), and the rate of charging will also be a function of the intensity with which the resultant light beam strikes the photosensitive transistor (604). When and if the capacitor (607) charges to a threshold value ($V_{REF}$), the comparator (608) will provide an appropriate signal to the microprocessor (605). Each LED (603) can be tested in turn in this manner.

Since the microprocessor (605) controls when each LED (603) is active, and when and if the comparator (608) indicates that the photosensitive transistor (604) has detected a resultant light beam, the microprocessor can readily determine whether the token being tested has optical characteristics that match the predetermined optical characteristics for a valid token.

Similar results could be expected by using a single light source and multiple light sensitive devices, or multiple light sources and multiple light sensitve devices. Other circuitry could also be added to test other validation criteria, such as token size, material composition, and so forth in accordance with well understood prior art practice.

Figure 7:
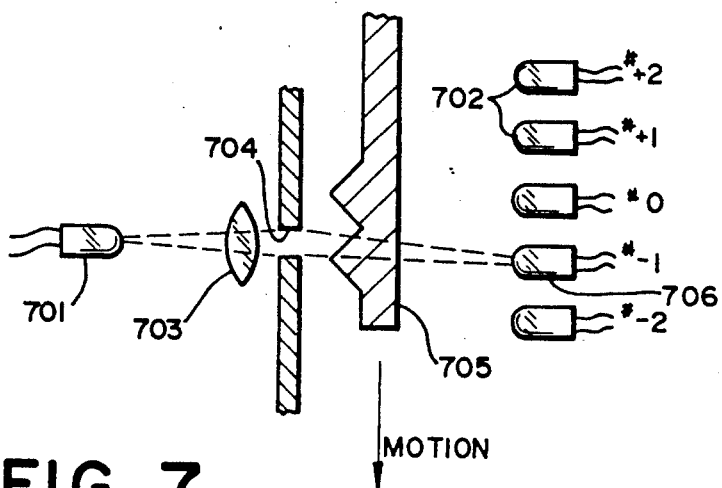
FIG. 7 comprises a side elevational diagramatic depiction of the token validation device in conjunction with a token.

With reference to FIG. 7, a token validation device that makes use of a single light source (701) and multiple light sensing devices (702) can be seen. A lens (703) may be used in an appropriate application, along with an apperture structure (704), to properly direct the source light beam to the intended facet area. When properly positioned, the token (705) will cause the source light beam to be bent toward a particular light sensing device (706). The microprocessor described earlier can detect this and determine whether the token being tested exhibits the optical characteristics of a valid token.

Figure 8:
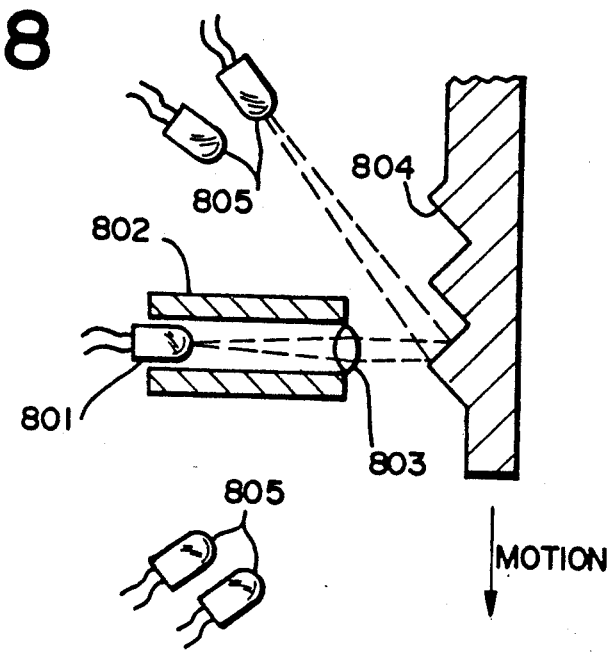
FIG. 8 comprises a side elevational diagramatic depiction of a second embodiment of a token validation device in conjunction with a token.

With reference to FIG. 8, an alternative embodiment for a token validation device can be seen that has particular use with tokens having an opaque backing on one side thereof as referred to earlier. In this embodiment, the source light beam is directed from a single light source (801) through an appropriate guide (802) and lens (803) to the token (804). The token (804) in this example may be presumed to have diffraction reflective facets, as versus the refractive facets evident in the tokens described above. Here, the resultant light beam reflected off the facet can be detected by one of the light sensing devices (805) disposed about the token (804), and a determination can again be made as to whether the token being tested exhibts the expected optical characteristics.

Figure 9:
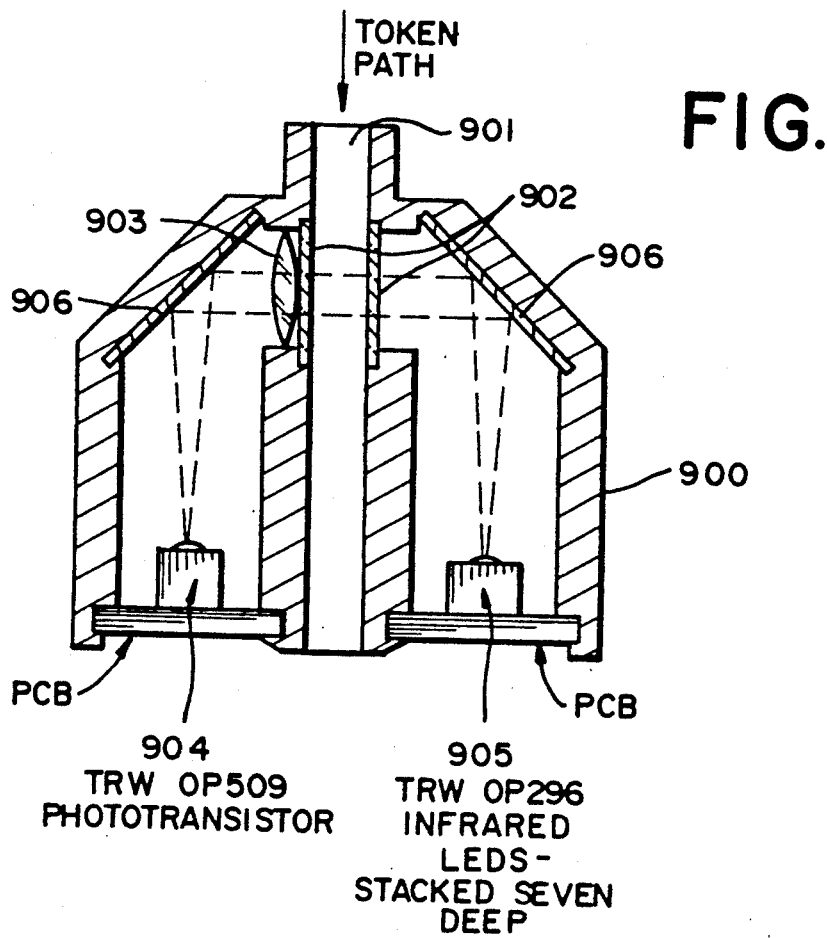
FIG. 9 comprises a side elevational sectioned view of an optical cavity housing.

FIG. 9 depicts an optical cavity housing (900) that can be used to house an appropriate decoding mechanism. This optical cavity housing (900) includes a token path (901) formed therethrough for allowing passage of a token, two windows (902) mounted within the token path (901) within transversly disposed windows formed in the token path walls, and a focusing lens (903) disposed proximal to one of the windows (902). An appropriate phototransistor (904) can be mounted within the housing (900), and a plurality of LEDs (905) can be similarly mounted (in FIG. 9, the LEDs are mounted substantially parallel to one another). Reflective surfaces (906) are also provided to properly direct the source and resultant light beams. So configured, this optical cavity housing (900) would allow convenient parallel reading of a token having radially oriented refractive facets.

We claim:

1. A token validation device for use with a token operated device, wherein said token validation device includes:
    optical sensing means for testing a token substantially independent of orientation of the token with respect to predetermined optical characteristics that are disposed in a substantially radially symmetrical manner with respect to the token; and
    validation means responsive to said optical sensing means for validating said token as a valid token when said token has said predetermined optical characteristics.

2. The token validation device of claim 1 wherein said predetermined optical characteristics comprises a prismatic facet.

3. The token validation device of claim 1 wherein said predetermined optical characteristics comprises a diffraction grating.

4. The token validation device of claim 1 wherein said predetermined optical characteristics comprises a reflective facet.

5. The token validation device of claim 1 wherein said optical sensing means includes:
    A) light source means for directing source light beam at said token; and
    B) light sensing means for sensing at least a resultant light beam that results when said source light beam interacts with said at least one predetermined optical characteristics.

6. The token validation device of claim 5 wherein said light source means includes an LED.

7. The token validation device of claim 5 wherein said light sensing means includes a photosensitive transistor.

8. The token validation device of claim 5 wherein said validation means includes light energy responsive means for responding to said light sensing means when said light sensing means senses a resultant light beam having at least a predetermined intensity.

9. The token validation device of claim 8 wherein said light source means and said light sensing means are positioned such that said resultant light beam will only have an intensity that at least equals said predetermined intensity when said token has said predetermined optical characteristics.

10. The token validation device of claim 1 wherein said predetermined optical characteristics comprises a refractive facet.

11. A token for use with a token operated device, said token having predetermined optical characteristics disposed in a substantially radially symmetrical manner with respect thereto, such that said token operated device can validate said token as a valid token by detecting said predetermined optical characteristics substantially independent of orientation of the token.

12. The token of claim 11 wherein said token comprises a substantially disc shaped object.

13. The token of claim 12 wherein said predetermined optical characteristics are symetrically disposed about said disc shaped object, such that said predetermined optical characteristics are substantially orientation independent with respect to said disc shaped object's axis.

14. The token of claim 13 wherein said predetermined optical characteristics include at least two predetermined optical characteristics that are different from one another.

15. The token of claim 13 wherein said disc shaped object has a peripheral area that includes said predetermined optical characteristics, and a central area that includes a human readable identifying indicia.

16. The token of claim 13 wherein said disc shaped object includes:
    A) an outer peripheral area that includes a first predetermined optical characteristic;
    B) an inner peripheral area that includes a second predetermined optical characteristic, such that said token can be validated by determining that said outer peripheral area includes said first predetermined optical characteristic, and that said inner peripheral area includes said second predetermined optical characteristic.

17. The token of claim 12 wherein said predetermined optical characteristics comprises prismatic facets.

18. The token of claim 12 wherein said predetermined optical characteristics includes a diffraction grating.

19. The token of claim 12 wherein said predetermined optical characteristics includes a reflective facet.

20. The token of claim 12 wherein said predetermined optical characteristics will cause a beam of light to at least partially bend when passed therethrough.

21. The token of claim 11 wherein said token has disposed on one side thereof radially oriented predetermined optical characteristics, and on another side thereof annularly oriented predetermined optical characteristics.

22. The token of claim 11 wherein said token includes radially oriented predetermined optical characteristics and annularly oriented predetermined optical characteristics.

23. The token of claim 11 wherein said token includes a group of predetermined optical characteristics formed thereon, and further wherein repetitions of said group are disposed radially about said token.

24. The token of claim 11 wherein said token includes radially oriented predetermined optical characteristics.

25. The token of claim 24 wherein said token includes annularly oriented predetermined optical characteristics.

* * * * *